April 7, 1953   D. K. LIND   2,633,870
DEAD WEIGHT GAUGE FOR PRESSURE COOKERS
Filed Sept. 27, 1947   3 Sheets-Sheet 1
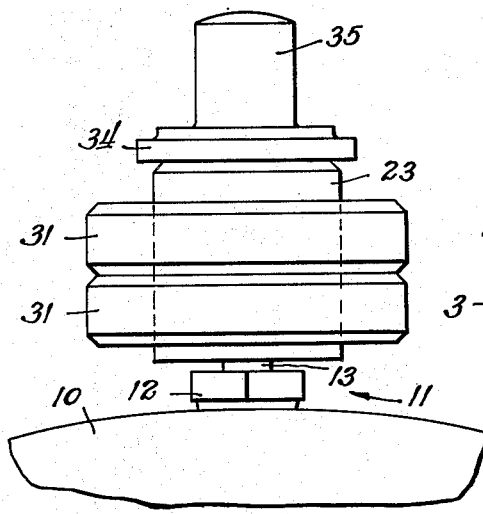
Fig.1.
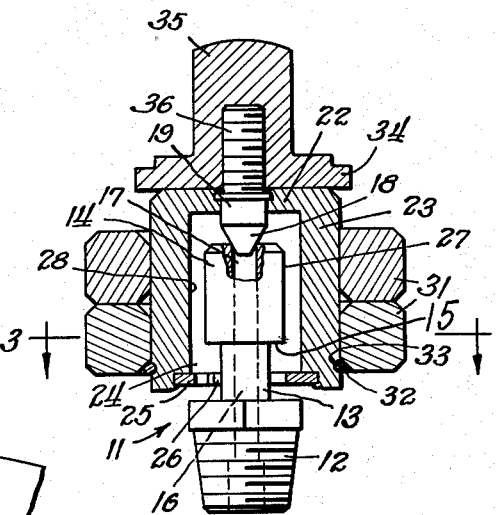
Fig.2.
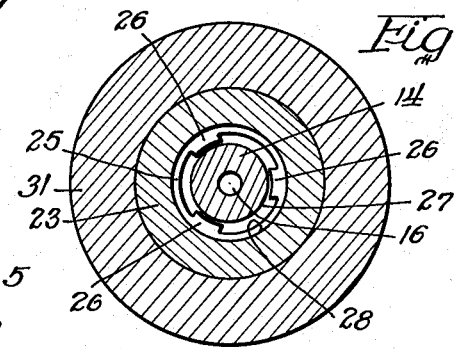
Fig.3.
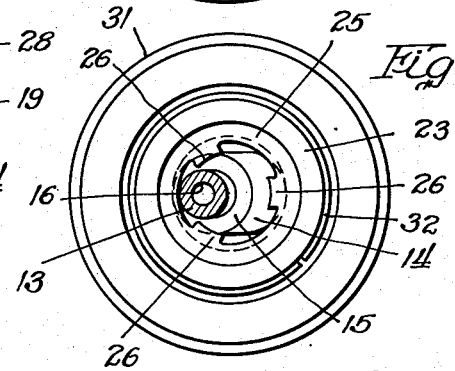
Fig.4.
Fig.5.
Inventor:
Donald K. Lind
By Brown, Jackson, Boettcher & Dienner
Attys.

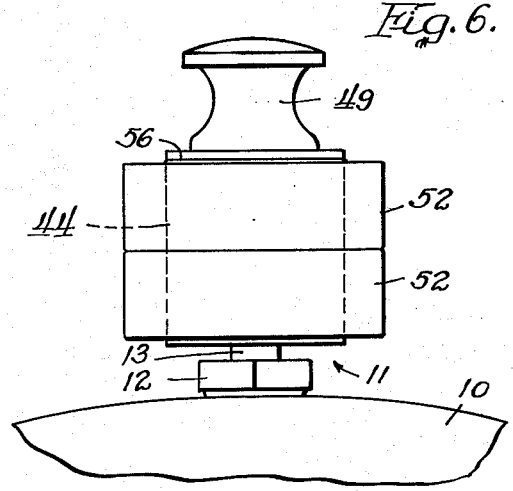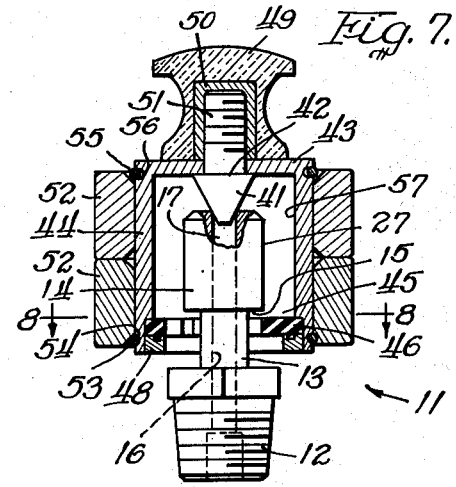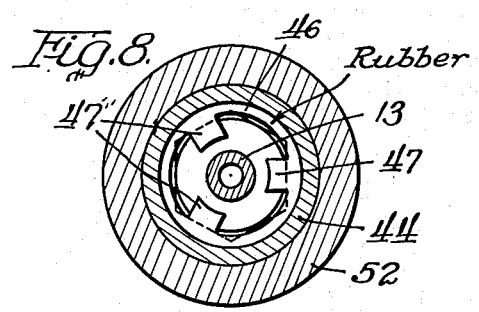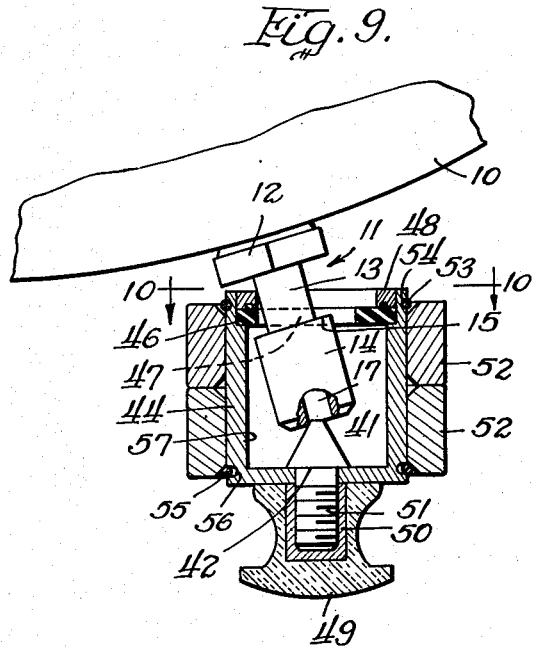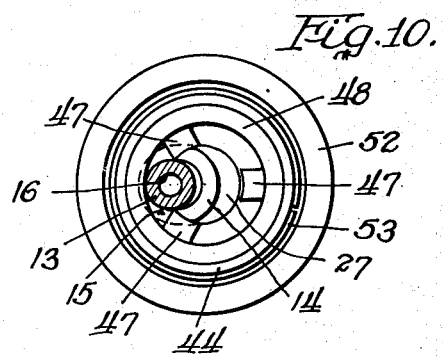

April 7, 1953  D. K. LIND  2,633,870
DEAD WEIGHT GAUGE FOR PRESSURE COOKERS
Filed Sept. 27, 1947  3 Sheets-Sheet 3

Inventor:
Donald K. Lind.
By Brown, Jackson, Boettcher & Dienner
Attys.

Patented Apr. 7, 1953

2,633,870

UNITED STATES PATENT OFFICE 2,633,870

DEAD WEIGHT GAUGE FOR PRESSURE COOKERS

Donald K. Lind, Menomonie, Wis., assignor to National Pressure Cooker Company, Eau Claire, Wis., a corporation of Wisconsin Application September 27, 1947, Serial No. 776,593

13 Claims. (Cl. 137—534)

This invention relates, generally, to gauges and it has particular relation to dead weight gauges for use with pressure cookers for measuring the pressure therein and for maintaining the same at a predetermined value.

Among the objects of this invention are: To provide for retaining a pressure gauge of the dead weight type in place on the vent pipe of a pressure cooker with which it is associated; to prevent such a pressure gauge from becoming detached accidentally from the vent pipe as a result, for example, of the application of excess pressure thereto from within the cooker or of the turning of the cooker cover nearly but not entirely to the upside down position; to permit removal of the gauge only by the withdrawal of the same axially of the vent pipe; to hold one or more weight rings in position on the gauge while permitting their ready removal to adapt the gauge for operation at various pressures; to permit relative movement between the gauge and vent pipe to relieve the internal pressure and maintain the same at the desired value; to provide for a relatively great freedom of movement between the gauge and the vent pipe so that the former can oscillate or swing like a pendulum in releasing the internal pressure to maintain the same at a predetermined constant value; and to control the pressure within the pressure cooker by oscillation or pendulum type motion of the gauge relative to the vent pipe.

Other objects of this invention will, in part, be obvious and in part appear hereinafter.

The invention is disclosed in the embodiments thereof shown in the accompanying drawings and it comprises the features of construction, combination of elements and arrangement of parts which will be exemplified in the constructions hereinafter set forth and the scope of the application of which will be indicated in the appended claims.

For a more complete understanding of the nature and scope of this invention reference can be had to the following detailed description taken together with the accompanying drawings, in which:

Figure 1 is a view, in side elevation, of one gauge construction in accordance with this invention, the illustration being at a scale which is double the actual size of the sample which has been constructed;

Figure 2 is a longitudinal sectional view of the gauge shown in Figure 1 at the same scale;

Figure 3 is a detail sectional view taken along the line 3—3 of Figure 2;

Figure 4 is a view, partly in side elevation and partly in section, showing how the gauge is retained on the vent pipe even though the cover to which the latter is secured is turned almost to the full upside down position;

Figure 5 is a detail sectional view taken along the line 5—5 of Figure 4;

Figure 6 is a view, in side elevation, of another gauge construction in accordance with this invention, the scale being double the scale of the sample which has been constructed;

Figure 7 is a longitudinal sectional view of the gauge shown in Figure 6;

Figure 8 is a detail sectional view taken along the line 8—8 of Figure 7;

Figure 9 is a view, similar to Figure 4, and showing how the gauge is retained in position on the vent pipe even though the cover is turned close to the full upside down position;

Figure 10 is a detail sectional view taken along the line 10—10 of Figure 9;

Figure 11:
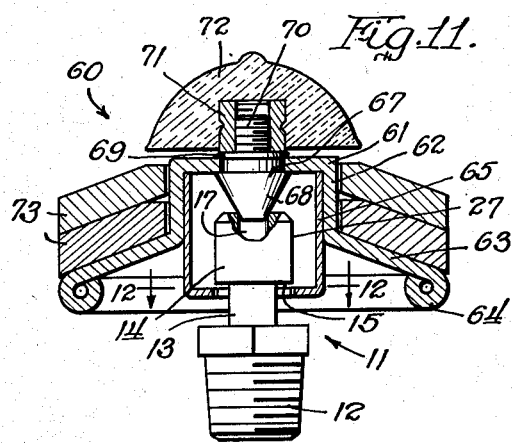
Figure 11 is a longitudinal sectional view at double scale of another gauge construction.

Referring now particularly to Figures 1 and 2 of the drawings, it will be observed that the reference character 10 designates a cover of a pressure cooker such as a pressure cooker of the type shown in Patent No. 2,218,188. Since the details of construction of the pressure cooker are conventional, so far as this application is concerned, and, further, since these details are well known to those skilled in the art, a more complete disclosure thereof is omitted from this specification. The cover 10 is provided with a vent pipe, shown generally at 11, which extends vertically upwardly from the cover 10 when it is held in the normal horizontal upright position. At its lower end the vent pipe 11 is provided with a tapered thread 12 for inserting the same into the cover 10. The vent pipe 11 also has a reduced intermediate section 13 and a head section 14 the underside of which provides a shoulder 15 that faces the cover 10 which is employed for a purpose that is set forth hereinafter.

An aperture 16 extends centrally through the vent pipe 11 and communicates with the interior of the pressure cooker in the usual manner. The upper end 17 of the aperture may be closed by the conical lower end 18 of a valve member 19 which may be inserted in and secured to the upper closed end 22 of a cylindrical body member 23 that may be formed of brass or similar corrosion resisting material. The lower end 24 of the body member 23 is open to permit the former to have telescopic movement with respect to the vent pipe 11.

It will be understood that the valve member 19 closes the upper end 17 of the aperture 16 in the vent pipe 11 and thereby permits the building up of pressure within the pressure cooker. When this pressure reaches a predetermined value which depends upon the diameter of the aperture 16 and the force exerted on the valve member 19 by the mass of the body member 23 and parts resting thereon, the valve member 19 is moved off of the upper end 17 of the aperture 16 to relieve the pressure. As will be set forth in detail hereinafter, this is accomplished in a novel and efficient manner when the gauge construction shown and described herein is employed.

There is the possibility that the body member 23 and the elements attached thereto might be blown off of the vent pipe 11 on the generation of sufficient pressure within the pressure cooker. Also, there is the likelihood that the body member 23 and the elements secured thereto might accidentally drop off of the vent pipe 11 when the cover 10 is turned close to but not fully to the complete upside down position as illustrated in Figure 4. As indicated hereinbefore, it is desirable to prevent such accidental disconnection of the gauge from the vent pipe 11 except when the former is moved axially of the latter which usually is the case only when the gauge is intentionally removed or the cover 10 is turned completely upside down.

With a view to preventing the accidental disengagement of the gauge from the vent pipe 11 detent means 25 in the form of a retainer washer is secured to the lower end of the body member 23. It may be secured thereto in any suitable manner such as by rolling a lip of the body member 23 over the washer 25 as illustrated. The detent means or washer 25 has integrally formed projections 26, best shown in Figure 3, which project radially inwardly and are spaced apart to provide a slight clearance between their inner surfaces and the outer surface 27 of the head section 14.

When the gauge is accidentally moved off of the upper end of the vent pipe 11 as described, it is unlikely that it will be moved in axial alignment therewith. Accordingly, one of the projections 26 or possibly two of them or portions thereof will engage the shoulder 15, as shown in Figure 5, and thus prevent separation of the gauge from the vent pipe 11. As shown in Figure 4 the upper end of the vent pipe 11 will engage the inner surface 28 of the body member 23 and will become wedged between it and the projections 26 of the detent means or washer 25.

While the washer or detent means 25 is capable of preventing the accidental disengagement of the gauge from the vent pipe 11, it does not interfere with its separation therefrom when it is moved axially thereof with the space between its projections 26 being aligned with the periphery of the head 14 of the vent pipe 11, as is the case when it is intentionally removed or, as may be the case, when the cover 10 is turned completely upside down.

In the embodiment of the invention as shown in Figures 1 through 5 of the drawings the detent means or washer 25 is formed of metal, such as brass. As will appear hereinafter, it may be formed of resilient material such as rubber.

It is desirable that provision be made for varying the force which holds the valve member 19 in place to close the upper end 17 of the aperture 16. The reason for this is to permit the gauge to maintain various pressures within the pressure cooker for performing different operations or for cooking foods at different temperatures and pressures. For this purpose ring weights 31 may be slidably mounted around the body member 23. As shown, two ring weights 31 may be employed. It will be understood that only a single ring weight 31 may be employed or that more than two can be employed if desired. Also, it will be understood that the body member 23 itself functions as a weight and that the gauge may be operated for a given set of conditions without the addition of any of the ring weights 31.

With a view to preventing the ring weights 31 from sliding down over the body member 23 beyond the position shown, a snap ring 32 is located in a peripheral groove 33 in the body member 23 near its lower end, as shown. The ring weights 31 are prevented from sliding off of the upper end of the body member 23 by a lip 34 that projects radially from a cap 35 beyond the outer surface of the body member 23. The cap 35 is detachably secured in position. As shown, it may be threaded on an extension 36 of the valve member 19.

The gauge construction is such that its center of gravity is below its point of support at the upper end of the vent pipe 11. This is true whether or not one or both or neither of the ring weights 31 is present. Also it will be noted that the inner surface 28 of the body member 23 is spaced from the outer surface 27 of the head section 14 at the upper end of the vent pipe 11. When the gauge is in operative position, as shown in Figure 2, the inner surfaces of the projections 26 are spaced away from the outer surface of the reduced intermediate section 13. This spacing of the body member 23 from the vent pipe 11 and the location of the center of gravity below the upper end of the vent pipe 11 permit the gauge to oscillate or rock with a pendulous motion on the application of predetermined pressure from the pressure cooker through the aperture 16 in the vent pipe 11 so that, instead of lifting the valve member 19 vertically from the upper end of the aperture 16, its conical lower end 18 is rocked sidewise out of engagement with the vent pipe 11 or more specifically out of engagement with the edge of the upper end 17 of the aperture 16, pivoting meanwhile on the diametrically opposite edge portion. The rate of oscillation or swinging with a pendulous motion is a function of the pressure within the cooker 10. At the controlled pressure the oscillations are rather slow but, if the pressure increases, there is a corresponding increase in the rate of oscillation. This allows a more gradual relief of the pressure from within the pressure cooker than is accomplished in gauge where the construction is such that the valve member must be lifted substantially entirely off of the upper end of the vent pipe to accomplish the desired pressure relief. This sidewise pendulous movement of the conical lower end 18 of the valve member 19 is not limited to movement in a single vertical plane. Rather it may take place in any vertical plane through the vent pipe 11.

Another embodiment of the invention is illustrated in Figures 6 through 10 of the drawings. As there shown the same vent pipe 11 may be provided in the cover 10 of a pressure cooker. The upper end 17 of the aperture 16 in the vent pipe 11 may be closed by a conical lower end 41 of the valve member 42 that is carried by the closed upper end 43 of the cylindrical body member 44. As before, the body member 44 can be formed of brass and itself constitutes a portion of the weight that applies the force to the valve member 42 for closing the upper end 17 of the aperture 16. The body member 44 has an open lower end 45 and it is arranged to telescope with the head section 14 of the vent pipe 11.

In order to prevent accidental disengagement of the body member 44 and parts attached thereto from the vent pipe 11, a detent member or rubber retainer washer 46 may be provided near the open end 45 of the body member 44. The washer 46 may have projections 47, Figure 8, integrally formed therewith. The projections 47 extend radially inwardly so that they engage the outer surface 27 of the head section 14 and thereby have frictional engagement therewith as the gauge is moved away from the cover 10. The projections 47 cooperate with the shoulder 15, as described hereinbefore, for preventing the gauge from accidentally disengaging the vent pipe 11. When the washer 46 and the integrally formed projections 47 are made of a resilient material such as natural or synthetic rubber or combinations thereof, there is considerable resistance to the movement of the gauge relative to the vent pipe 11 even when the movement takes place axially of the latter. This can be overcome readily by the operator when the gauge is lifted bodily from the vent pipe 11.

In order to hold the detent means or rubber retainer washer 46 in position a metal retaining ring 48 is provided underneath the same as shown more clearly in Figures 7 and 9 of the drawings. The retaining ring 48 may be secured in position by having a lip formed from the body member 44 spun over the ring 48.

A knob 49 of suitable insulating material may be provided at the upper end of the body member 44 for handling the same. The knob may be molded about a metallic insert 50 which, as shown, may be threaded on the upper end 51 of the valve member 42. By forming the knob 49 of heat insulating material, such as a phenolic condensation product, the likelihood of the operator burning his fingers in removing the gauge from the vent pipe 11 is materially reduced.

The force with which the valve member 42 closes the upper end 17 of the aperture 16 can be varied by the addition of ring weights 52. The lower ring weight 52 may be supported slidably on the outer surface of the cylindrical body member 44 by a suitable snap ring 53 that is located in a peripheral groove 54 near the lower end of the body member 44. A similar snap ring 55 is located in a groove 56 near the upper end of the body member 44. The groove 56 is relatively deep so that the snap ring 55 is loosely located therein. The groove 56 is deep enough to permit the snap ring 55 to be compressed sufficiently to permit the ring weights 52 to be applied to or removed from the body member 44.

The gauge illustrated in Figures 6 through 10 and just described functions to relieve the pressure by moving in an oscillatory fashion with a pendulum-like movement similar to that described for the gauge shown in the preceding figures. The conical lower end 41 of the valve member 42 is rocked sidewise away from the upper end of the aperture 16 on one side thereof while it remains in engagement with the other side and pivots about the same since the center of gravity of the gauge, with or without the weights 52 is below its support point at the top of the vent pipe 11. As the gauge oscillates or moves with a pendulous motion, the pivot point shifts around the upper end of the aperture 16, while the main part of the opening to relieve the pressure is diametrically opposite the pivot point. As described before, this makes for a more uniform release of the pressure. This movement is permitted since the inner surface 57 of the body member 44 is spaced a substantial distance away from the outer surface 27 of the head section 14, the projections 47 are likewise spaced from the reduced intermediate section 13 of the vent pipe 11 and the center of gravity of the gauge is located as indicated.

Figure 12:
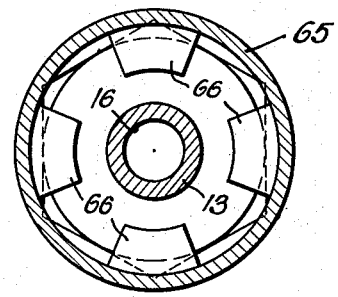
Figure 12 is a detail sectional view, at an enlarged scale, taken along the line 12—12 of Figure 11.

Another embodiment of the gauge is shown in Figure 11, generally, at 60 for application to the vent pipe 11. It includes a body member 61 having a central cylindrical part 62 with a radially extending downwardly sloped or beveled part 63 the periphery of which is rolled underneath as indicated at 64. A retainer sleeve 65 is secured to the body member 61 and extends downwardly therefrom with radially inwardly extending projections 66, Figure 12, which cooperate with the shoulder 15 to prevent accidental disengagement of the gauge 60 from the vent pipe 11.

A valve member 67 is located centrally of the body member 61 and it has a conical lower end 68 which, as shown, fits into the upper end 17 of the aperture that extends through the vent pipe 15. The gauge 60 swings with the pendulous motion previously described to move the conical end 68 out of engagement with the upper end 17 of the vent pipe opening 16 to relieve the pressure within the pressure cooker and maintain the same at the desired value. The valve member 67 is held in place in the body member 61 by a flange 69.

The valve member 67 has a threaded extension 70 on which an insert 71 is threaded. The insert 71 may have a cap 72 of suitable plastic material or the like moulded therearound. The cap 72 is readily removable by unscrewing it to permit removal or replacement of conically shaped ring weights 73 over which the lower portion thereof extends. It will be understood that the weights 73 are employed to vary the pressure at which the gauge 60 oscillates or swings with a pendulous motion to relieve the pressure as described. With or without the weights 73 the center of gravity of the gauge 60 is below its point of support on the upper end of the vent pipe 11.

Figure 13:
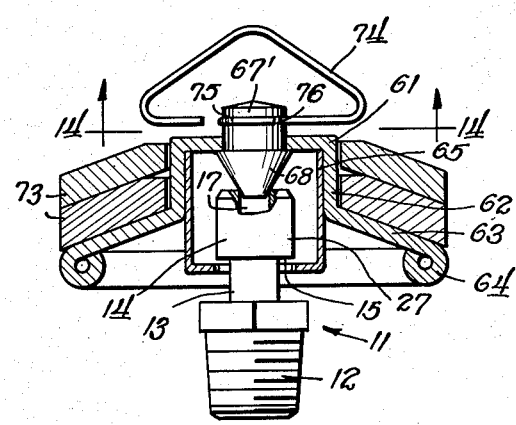
Figure 13 is a view, similar to Figure 11, showing a modified form of the weight retaining means.
Figure 14:
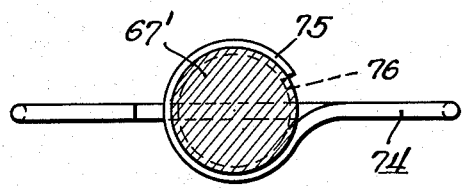
Figure 14 is a detail sectional view, at an enlarged scale, taken along the line 14—14 of Figure 13.

In Figures 13 and 14 a spring wire clip 74 is shown instead of the cap 72 for preventing accidental removal of the weights 73. The clip 74 has a circular gripping portion 75 in a groove 76 near the upper end of the valve member 67'. It will be understood that the portion 75 can be removed readily from the groove 76 and replaced therein when it is desired to remove or replace the weights 73.

While the body members 23, Figure 2, 44, Figure 7, and 61, Figure 11, are illustrated as being closed at their upper ends, it will be apparent that this is not necessarily so and that their upper ends may be open to the atmosphere, if desired.

The action of the dead weight gauge construction disclosed herein is entirely different from the action of the dead weight gauges of the prior art. Because of the relatively great clearance between the inner surface of the body members 23, Figure 2, 44, Figure 7, or the retainer sleeve 65, Figure 11, and the outer surface of the corresponding vent pipe 11 which extends upwardly from the cover 10, the gauge in each case can rock on the vent pipe 11. As indicated hereinbefore the weight distribution of the gauge is such that, with or without one or both of the removable ring weights, the center of gravity is below the point of support of the conical lower end of the valve member 19, 42 or 67 on the upper end of the vent pipe 11. This arrangement of parts permits the gauge to oscillate with a pendulous motion.

When the pressure within the pressure cooker reaches a value which overcomes the weight of the gauge constructed and arranged as disclosed herein, the gauge rises partially from the upper end of the vent pipe 11 and permits some steam to escape. The steam thus permitted to escape does not have a jet or velocity action since it does not tend to hold the gauge up away from the upper end of the vent pipe 11. Rather, because of the configuration of the valve seat the the upper end 17 of the aperture 16 and the cooperating conical lower end 18, 41, or 68 of the valve member, the force of the steam is converted into a mechanical impulse which causes the gauge to swing as a pendulum. Once this action is started, the steam escapes in a series of oppositely directed impulses which tend to continue the pendulum action. If the internal pressure of the pressure cooker is increased, the impulses are increased in value and the gauge rocks or swings more rapidly. This action continues unless the internal pressure reaches a substantially greater value in which case the gauge is raised completely off of the vent pipe 11 until the internal pressure returns to approximately that at which the gauge started to rock.

Tests have shown that there is a very small differential between the internal pressure which is sufficient to start the gauge to oscillate with a pendulous movement and the pressure which permits the gauge to reseat itself after the pressure has been reduced. For example, it has been found that this differential in pressure using a gauge construction as described herein is of the order of one tenth of a pound per square inch.

The action of the gauge disclosed herein is considered to be dependent upon the manner in which the upper end 17 of the vent pipe 11 is opened during the pendulous movement of the gauge, which is permitted by the clearance between it and the vent pipe 11, as compared to the opening which is provided when the dead weight gauges of the prior art operate. The conventional dead weight gauge of the prior art has a valve and seat that is constructed so that the gauge is lifted off of the valve seat and the entire area, such as the area of the upper end 17 of the aperture 16 in the vent pipe 11, is uncovered. While this opening may be very small, it allows the steam to come out of the vent pipe in the form of a jet. In contradistinction to this, when the gauge constructed as disclosed herein starts to rock, the upper end of the aperture 16 in the vent pipe 11 is opened at only one or two points and the steam issuing therefrom impinges on the inner surface of the gauge at a suitable angle to give the same an impulse. Since these impulses occur each time that the gauge is rocked and are applied at spaced points to the gauge, it tends to keep on oscillating or swinging with the pendulous motion. The steam escapes in a series of impulses or puffs instead of in a continuous stream as in the conventional dead weight gauges of the prior art. This results from the continuous rocking action of the gauge in opening and closing the upper end 17 of the aperture 16 at a speed which depends upon the internal pressure.

The pendulous movement which results from the use of the gauge construction disclosed herein is very desirable since it provides a much more accurate control of the pressure in the pressure cooker. This, as indicated above, results in there being a relatively small differential in pressure between the internal pressure which is sufficient to start the gauge to oscillate with a pendulous movement and the pressure which permits the gauge to reseat itself after the pressure has been reduced. A further advantage resulting from the pendulous movement of the gauge disclosed herein is that its movement is easier to detect from a distance since the same is more readily observable.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A gauge for a pressure cooker comprising a normally vertically extending vent pipe adapted to be secured at the lower end thereof to the cooker cover and having a passage therethrough, said vent pipe having a portion of enlarged diameter at the free upper end thereof and a shoulder defined by the inner end of said portion of enlarged diameter, and a gauge adapted for cooperation with said vent pipe, said gauge including a hollow body member adapted to be positioned over said vent pipe, a valve member carried by said body member and adapted to engage the free end of said vent pipe to close the passage therethrough, and a detent ring disposed adjacent the lower end of said body member, said detent ring including a plurality of integral projections extending radially inward towards said vent pipe below said shoulder when said valve member is in engagement with the free upper end of said vent pipe, said detent projections defining a space therebetween of a diameter at least as great as the diameter of the said enlarged portion of said vent pipe, said body member having an inside diameter substantially in excess of the diameter of said enlarged portion of said vent pipe, said body member and said valve member being so constructed and arranged with respect to said vent pipe as to accommodate oscillatory movement of said gauge in a pendulous fashion with respect to said vent pipe, said detent ring and projections being so constructed and arranged as to engage said shoulder when said gauge is moved with respect to said vent pipe in any direction other than substantially axially of said vent pipe, said body member and said valve member being further so constructed and arranged that when said detent projections engage said shoulder said enlarged portion of said vent pipe becomes wedged between said projections and one of said members to prevent accidental separation of said gauge and said vent pipe.

2. For use in indicating and controlling the pressure within a closed tiltable vessel, the combination of a vent pipe having a normally vertically extending passageway which is adapted to communicate with the interior of the vessel, said vent pipe having a portion of lesser external diameter and having a portion of greater external diameter adjacent the free end thereof, a shoulder between said portions, a hollow body member for telescoping over said vent pipe, valve means carried by the upper end of said body member for interfitting with and closing the upper end of the passageway of the pipe, and detent means extending inwardly from said body member toward the vent pipe, said detent means being positioned at that portion of the vent pipe having the lesser external diameter, the space defined inwardly of said detent means having a diameter at least as great but not substantially greater than the greater external diameter of said vent pipe, said detent means being so constructed and arranged that the same accommodates movement of said body member away from said vent pipe beyond said shoulder only when said detent means is accurately aligned with the vent pipe portion of greater external diameter, said detent means being further so constructed and arranged that upon movement of said body member away from said vent pipe when said detent means is not aligned with the vent pipe portion of greater external diameter the same engages said shoulder to prevent accidental separation of said body member from said vent pipe when the vessel is tilted.

3. For use in indicating and controlling the pressure within a closed tiltable vessel, the combination of a vent pipe having a normally vertically extending cylindrical passageway which is adapted to communicate with the interior of the vessel, said vent pipe having a portion of lesser external diameter and having a portion of greater external diameter adjacent the free end thereof, a shoulder between said portions, a hollow body member for telescoping over said vent pipe, a cone-shaped valve member depending from the upper end of said body member for interfitting with and closing the upper end of the passageway of the pipe, the inside diameter of said body member being substantially greater than the greater external diameter of said vent pipe, and detent means extending inwardly from the lower end of said body member toward the vent pipe, said detent means being positioned at that portion of the vent pipe having the lesser external diameter, the edge of said detent means being spaced a substantial distance from said lesser external diameter of the pipe and the surface of said detent means facing the shoulder being spaced therefrom, the spacing of the detent means and of the inner surface of said body member with respect to the vent pipe accommodating oscillatory movement in a pendulous fashion of said body member, said body member, said detent means and said vent pipe being so constructed and arranged that said valve is adapted to pivot on the edge of the passageway of the vent pipe to release pressure and impart a pendulous movement to said body member, the center of gravity of said body member lying below the pivot point of said valve, the space defined inwardly of said detent means having a diameter at least as great but not substantially greater than the greater external diameter of said vent pipe, said detent means being so constructed and arranged that the same accommodates movement of said body member away from said vent pipe beyond said shoulder only when said detent means is accurately aligned with the vent pipe portion of greater external diameter, said detent means being further so constructed and arranged that upon movement of said body member away from said vent pipe when said detent means is not aligned with the vent pipe portion of greater external diameter the same engages said shoulder to prevent accidental separation of said body member from said vent pipe when the vessel is tilted.

4. The invention, as set forth in claim 2, wherein the detent means is a washer having spaced projections extending radially inwardly, said projections being positioned at the portion of the vent pipe having the lesser external diameter.

5. The invention, as set forth in claim 1, wherein the detent ring is a rubber washer.

6. The invention, as set forth in claim 5, wherein the projections on the rubber washer detent ring, upon predetermined relative axial movement of the body member relative to the vent pipe, are adapted to have frictional engagement with the vent pipe thereby requiring that substantial force be applied to remove the gauge axially of said vent pipe.

7. The invention as set forth in claim 2, together with at least one ring weight slidably mounted externally of said body member, and means projecting radially outwardly from the lower end of said body member for supporting said ring weight.

8. The invention, as set forth in claim 7, wherein retaining means in the form of a spring wire clip projects radially outwardly from the upper end of the body member for preventing accidental removal of the weight ring.

9. The invention, as set forth in claim 2, together with at least one ring weight slidably mounted externally of said body member, means projecting radially outwardly from the lower end of said body member for supporting said ring weight, and retaining means projecting radially outwardly from the upper end of the body member for preventing accidental removal of the ring weight.

10. The invention as set forth in claim 1, together with at least one ring weight slidably mounted externally of said body member, means projecting radially outwardly from the lower end of said body member for supporting said ring weight, and retaining means projecting radially outwardly from the upper end of the body member for preventing accidental removal of the ring weight, said retaining means comprising a snap ring loosely positioned in a peripheral groove in the outer surface of the body member which snap ring is capable of being depressed into the groove by the ring weight to permit removal or application of said weight.

11. For use in indicating and controlling the pressure within a closed tiltable vessel, the combination of a vent pipe having a normally vertically extending passageway which is adapted to communicate with the interior of the vessel, said vent pipe having a portion of lesser external diameter and having a portion of greater external diameter adjacent the free end thereof, a shoulder between said portions, a hollow body member for telescoping over said vent pipe, valve means carried by the upper end of said body member for interfitting with and closing the upper end of the passageway of the pipe, detent means extending inwardly from said body member toward the vent pipe at that portion having the lesser external diameter, the space defined inwardly of said detent means having a diameter at least as great but not substantially greater than the greater external diameter of said vent pipe, said detent means being so constructed and arranged that the same accommodates movement of said body member away from said vent pipe beyond said shoulder only when said detent means is accurately aligned with the vent pipe portion of greater external diameter, said detent means being further so constructed and arranged that upon movement of said body member away from said vent pipe when said detent means is not aligned with the vent pipe portion of greater external diameter the same engages said shoulder to prevent accidental separation of said body member from said vent pipe when the vessel is tilted, at least one ring weight slidably mounted externally of said body member, means projecting radially outwardly from the lower end of said body member for supporting said ring weight, and retaining means projecting radially outwardly from the upper end of the body member for preventing accidental removal of the ring weight, said retaining means comprising a flange forming an integral part of a cap of low heat conductivity removably secured to the upper end of the body member, said cap holding the valve member in place inwardly of the body member and said cap serving as an insulating finger grip for the gauge.

12. For use in indicating and controlling the pressure within a closed tiltable vessel, the combination of a vent pipe having a normally vertically extending passageway which is adapted to communicate with the interior of the vessel, said vent pipe having a portion of lesser external diameter and having a portion of greater external diameter adjacent the free end thereof, a shoulder between said portions, a hollow body member for telescoping over said vent pipe, valve means carried by the upper end of said body member for interfitting with aid closing the upper end of the passageway of the pipe, detent means extending inwardly from said body member toward the vent pipe at that portion having the lesser external diameter, the space defined inwardly of said detent means having a diameter at least as great but not substantially greater than the greater external diameter of said vent pipe, said detent means being so constructed and arranged that the same accommodates movement of said body member away from said vent pipe beyond said shoulder only when said detent means is accurately aligned with the vent pipe portion of greater external diameter, said detent means being further so constructed and arranged that upon movement of said body member away from said vent pipe when said detent means is not aligned with the vent pipe portion of greater external diameter the same engages said shoulder to prevent accidental separation of said body member from said vent pipe when the vessel is tilted, at least one ring weight slidably mounted externally of said body member, and means projecting radially outwardly from the lower end of said body member for supporting said ring weight, said weight supporting means comprising a downwardly beveled extension of the body member and said ring weight being correspondingly beveled.

13. A gauge for a pressure cooker comprising a normally vertically extending substantially cylindrical vent pipe adapted to be secured at the lower end thereof to the cooker cover and having a passage therethrough, said vent pipe having a portion of enlarged diameter at the free upper end thereof and a shoulder defined by the inner end of said portion of enlarged diameter, and a gauge adapted for cooperation with said vent pipe, said gauge including a hollow generally cylindrical body member adapted to be positioned over said vent pipe, a valve member carried by said body member and adapted to engage the free upper end of said vent pipe to close the passage therethrough, and a detent ring secured within said body member adjacent the lower end thereof, said detent ring including a plurality of integral rigid projections extending radially inward toward said vent pipe below said shoulder when said valve member is in engagement with the free upper end of said vent pipe, said detent projections defining a space therebetween of a diameter slightly greater than the diameter of the said enlarged portion of said vent pipe, said body member having an inside diameter substantially in excess of the diameter of said enlarged portion of said vent pipe, said body member and said valve member being so constructed and arranged with respect to said vent pipe as to accommodate oscillatory movement of said gauge in a pendulous fashion with respect to said vent pipe, said detent ring and projections being so constructed and arranged as to engage said shoulder when said gauge is moved with respect to said vent pipe in any direction other than substantially axially of said vent pipe, said body member being further so constructed and arranged that when said detent projections engage said shoulder said enlarged portion of said vent pipe becomes wedged between said projections and said body member to prevent accidental separation of said gauge and said vent pipe.

DONALD K. LIND.

REFERENCES CITED

The following references are of record in the file of this patent:

UNITED STATES PATENTS

| Number | Name | Date |
|---|---|---|
| 1,862,337 | Emrick | June 7, 1932 |
| 2,308,320 | Stephens | Jan. 12, 1943 |
| 2,428,483 | Wittenberg | Oct. 7, 1947 |
| 2,509,101 | Kircher | May 23, 1950 |

FOREIGN PATENTS

| Number | Country | Date |
|---|---|---|
| 4,419 | Great Britain | Dec. 23, 1874 |
| 17,950 | Great Britain | Sept. 21, 1894 |
| 243,569 | Switzerland | Jan. 3, 1947 |